United States Patent [19]

Hackenberg

[11] 4,455,103
[45] Jun. 19, 1984

[54] FRAMEWORK COMPRISING SEPARABLY CONNECTED PROFILE BARS

[75] Inventor: Dieter Hackenberg, Witten, Fed. Rep. of Germany

[73] Assignee: Octanorm-Vertriebs-GmbH für Bauelemente, Filderstadt, Fed. Rep. of Germany

[21] Appl. No.: 396,723

[22] Filed: Jul. 9, 1982

[30] Foreign Application Priority Data

Jul. 20, 1981 [DE] Fed. Rep. of Germany ....... 3128595

[51] Int. Cl.³ .............................................. F16B 7/04
[52] U.S. Cl. ................................... 403/190; 403/322; 403/406
[58] Field of Search ............... 403/187, 188, 189, 191, 403/169, 170, 171, 172, 173, 174, 175, 176, 177, 178, 243, 406, 408, 322, DIG. 7, 388, 190

[56] References Cited

U.S. PATENT DOCUMENTS 3,574,367 4/1971 Jankowski ...................... 403/297 X
3,701,553 10/1972 Vogt .................................. 403/189

FOREIGN PATENT DOCUMENTS 1477591 3/1967 France ............................... 403/187

*Primary Examiner*—Dennis L. Taylor
*Attorney, Agent, or Firm*—Burns, Doane, Swecker & Mathis

[57] ABSTRACT

In a framework made of separably connected profile bars, some of the bars have longitudinal slots and others have hollow sections for engagement of a coupling member in their face ends. The coupling member consists of a bearing housing with an upwardly oriented wedge surface and a holding member with a matching inclined surface which is forced against the wedge surface by a spring force. The holding member can be moved in a longitudinal direction by an eccentric pin arranged transversely to the profile bar and located with its actuating end in a cross hole of the profile bar so that a coupling hook at the end of the holding member is movable both longitudinally relative to stationary projections of the bearing housing as well as laterally due to the rising movement of the matching inclined surface along the wedge surface. In order to obtain a reliable and easy-to-handle coupling member including the smallest possible number of detail parts, a resilient tongue is cut out from a sheet metal strip forming the holding member and bent so that an end of the tongue bears against an inner wall of the bearing housing and slides in a longitudinal guide. The wedge surface extends between the two coupling projections, and an offset of the holding member engages behind the wedge surface, locating the eccentric pin in a rear wall cut-out of the bearing housing. In addition, the resilient tongue enables the eccentric pin to be pressed in, similar to a pushbutton, so that in the initial position the actuating end of the pin is engaged in a cross hole of the profile bar.

9 Claims, 11 Drawing Figures

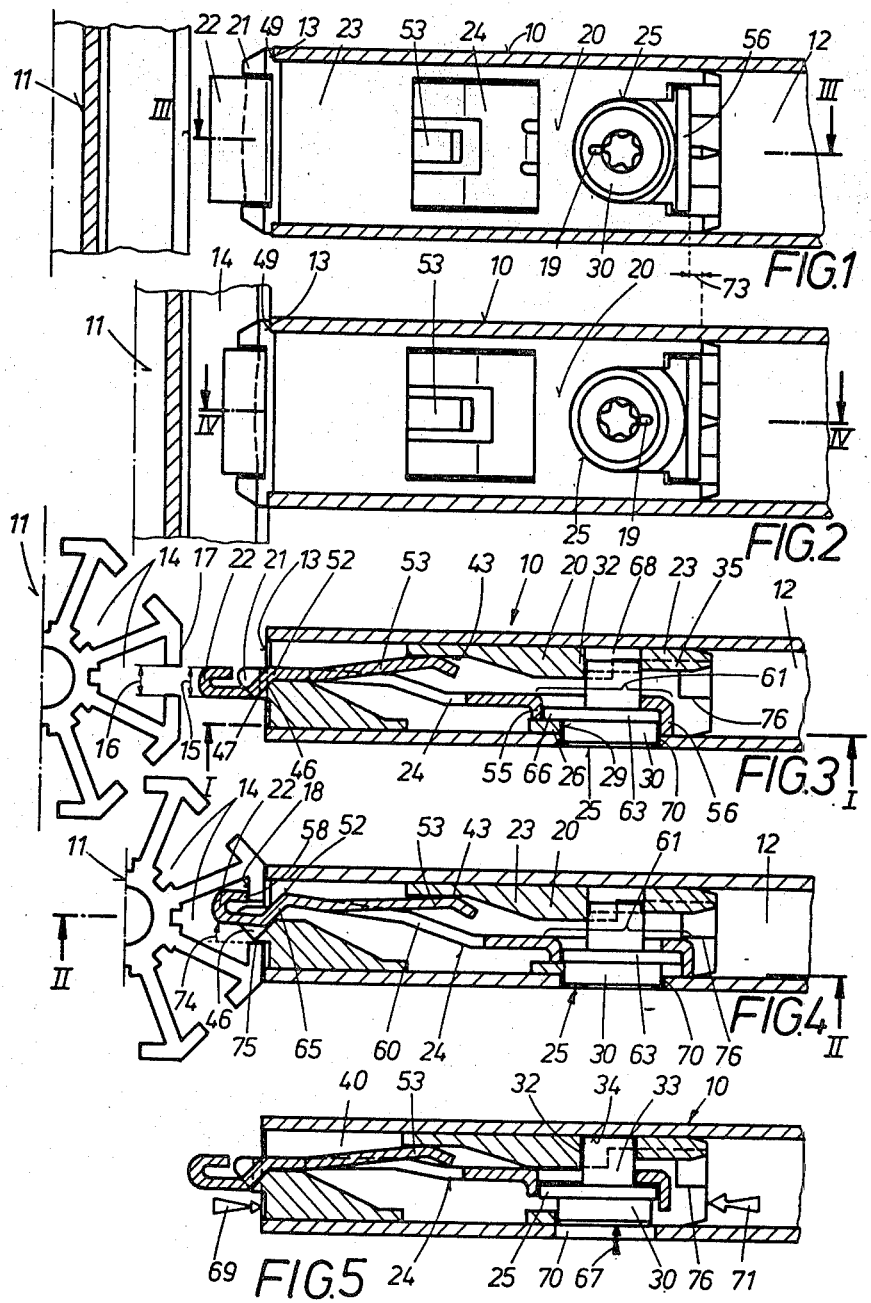

FRAMEWORK COMPRISING SEPARABLY CONNECTED PROFILE BARS

BACKGROUND AND SUMMARY OF THE PRESENT INVENTION

The present invention relates to a framework comprising separably connected profile bars. The connection is achieved by a coupling member consisting of a bearing housing and a holding member incorporated therein in a longitudinally movable manner. The coupling member is inserted into a hollow section of a first profile bar so that stationary coupling projections at an end of the bearing housing protrude from a face end of the bar. A free end of the holding member is provided with a coupling hook which is arranged between the two coupling projections of the bearing housing and also protrudes from the face end of the first profile bar. The pair of coupling projections and the coupling hook thus provide a coupling arrangement which can be inserted in an undercut longitudinal slot of another profile bar, e.g., a vertical column, and locked in position therein.

This locking in position is accomplished through an eccentric pin which extends transversely to the first profile bar, is rotatably supported in the bearing housing and passes through the holding member. An actuating end of the eccentric pin fits a cross hole of the profile bar which accepts the coupling member. During rotation of the eccentric pin, the eccentric of the eccentric pin moves the holding member in the longitudinal direction of the profile bar so that the coupling hook is also moved in the same direction. The coupling hook simultaneously performs a movement transverse to the profile bar, which movement is accomplished due to the fact that the bearing housing is provided with an inwardly and upwardly extending wedge surface and that the holding member has a matching inclined surface which is pressed against the wedge surface by a spring force.

The coupling member of the framework according to the present invention, firstly, is of special design since the coupling arrangements in their initial condition ready for coupling are situated in a common plane, i.e., the movable coupling hook lies between the two coupling projections. Therefore, the longitudinal slot of the profile bar, into which the coupling arrangements are to be engaged, need not be of a greater width than that required for accepting only one coupling arrangement, for example, the stationary coupling projections. In addition to the small opening width of the slot, a closed installation space of the coupling arrangements is achieved. Also, the two stationary coupling projections ensure a clearly defined location of the profile bar equipped with the coupling member during and after the coupling operation.

The design of the coupling member according to the present invention has the additional special feature that the coupling hook not only performs a transverse motion toward the coupling projections but simultaneously, because of the employed control arrangement, a longitudinal motion. Because of these simultaneously affected two motion components, a particularly safe and strong connection is obtained between the two profile bars. The transversely directed motion component first causes a locking in position of the two coupling arrangements at the opposing inner surfaces of the slot opening. This locking in occurs because the coupling hook moving in a transverse direction approaches one inner surface, while the two coupling projections will eventually rest against the opposite inner surface. During this transverse motion, the coupling hook leaves the common plane extending between the coupling projections and moves behind the adjacent wall of the longitudinal slot. Because of the simultaneously effected motion component directed longitudinally, the coupling hook moves against the inner surface of the longitudinal slot wall, bearing against the wall and thereby firmly pressing one profile bar against the face of the other profile bar which carries the coupling member. In this manner, one profile bar is pushed against the other.

In the case of known frames using coupling members in accordance with German utility model No. 73 71 203.0, the coupling member consists of numerous detail parts thereby making the manufacture per unit more expensive and requiring a laborious and time-consuming assembly of the coupling member at the profile bar. The holding member consists of a plate which, with its sloping shoulders, is forced against wedges of the bearing housing by a spring resting against an eccentric pin. Special locating devices, such as a circlip and an annular shoulder at the pin shaft, are required to secure the eccentric pin in the bearing housing. This locating in position makes the assembly of the components within the hollow section of the profile bar accepting the coupling member extremely difficult. Locating the pin relative to the bearing housing, however, is essential because the spring has the tendency to force the pin out of a cross hole in the profile bar. Moreover, it is nearly impossible to remove an installed coupling member in order to replace, for example, a broken spring without damaging the member.

The present invention has as an object to develop a framework for rapid and easy assembly of the initially mentioned type, whose coupling member consists of the most simple and easy-to-assemble and disassemble components for convenient installation in the profile bar and removal from the same as required.

This object and others are achieved by the present invention with a coupling member consisting of only three components, i.e., a bearing housing, a holding member specially formed from a sheet metal strip, and an eccentric pin. A resilient tongue cut out of the sheet metal strip of the holding member performs two different spring functions. One function is to keep the matching inclined surface of the holding member in contact with a wedge surface of the bearing housing. The other spring function is to load the eccentric pin like a pushbutton so that, by exerting an axial pressure, the pin can be pressed into the bearing housing until it comes out of the cross hole in the profile bar. This arrangement enables convenient installation and removal of the coupling member into and out of the profile bar.

According to the present invention the coupling member is an assembly which can be prefabricated from the above-mentioned three components for insertion into any profile bar provided with a cross hole. For insertion, all that has to be done is to press in the eccentric pin at its actuating end in an axial direction as described above. As soon as the coupling member has reached its specified location in the hollow section of the profile bar, the actuating end will automatically engage into the cross hole of the profile bar. This engagement accurately determines the location of the coupling member in the profile bar, especially if the mentioned stationary coupling projections at the bearing housing are provided with locating shoulders which will be arranged in front of the face of the profile bar. No additional locking elements are required to secure the coupling member in the profile bar.

According to another special aspect of the present invention, the controlling eccentric disk of the pin is located at the side of the holding member opposite the resilient tongue and acts as a stop which, with its outer face, bears against the inner side wall of the bearing housing. This defines the initial position of the "pushbutton" formed by the eccentric pin in the unpressed condition. The actuating end of the eccentric pin protrudes correspondingly from the bearing housing and enters the cross hole of the profile bar to the desired extent. When pressing in this "pushbutton", the control end of the holding member is caught by the eccentric disk thus deforming the resilient tongue.

The small number of components for the coupling member, and its securing in position in the profile bar, are possible because the holding member in accordance with the present invention simultaneously performs several functions. Firstly, of course, the front end coupling hook and the rear end control required for acting on the eccentric pin are formed from a sheet metal strip. The control may be one-sided projections, e.g., bent edge strips forming rails on one surface of the holding member against which the eccentric disk is arranged to effect the desired inward or outward thrust of the holding member during the rotational actuation of the eccentric pin. The second function of the holding member in accordance with the invention consists of the previously mentioned double spring function of the cut out resilient tongue, which is utilized for both maintaining contact between the holding member, the bearing housing and the pushbutton effect of the eccentric pin. A third function of the holding member is securing the eccentric pin in its installed end position in the bearing housing.

This last mentioned function is achieved in the following manner. In order to enable convenient assembly, when the holding member in accordance with the invention together with the eccentric pin is inserted into the bearing housing, a rear portion of the bearing housing is provided with a wall cut-out. Without the solution in accordance with the present invention, there is a risk that the eccentric pin may fall out of the wall cut-out unless additional locating means are provided. The invention overcomes this problem simply with a control arrangement which keeps the eccentric pin in a surrounding grip and, similar to an anchor, engages behind the wedge surface with the matching inclined surface produced by bending the sheet metal strip. This engagement is reliably secured through the above-mentioned spring action of the resilient tongue formed in the sheet metal strip. In this way, the resilient tongue performs a third function, i.e., the location of the eccentric pin in its installed position in the wall cut-out.

The space between the two coupling projections of the bearing housing is preferably utilized for the wedge surface, which provides, in particular, the following advantages. Firstly, the wedge surface is brought very far to the front and commences before the face of the profile bar so that in a coupling situation, the wedge surface also engages the slot opening. The connection between the two coupling projections causes a reinforcement of the mutual position of the two coupling projections. The portion of the holding member at this far advanced wedge surface is very short and therefore relatively stiff although a resilient sheet metal strip is used for forming the holding member. Finally, the advanced wedge surface enables an accumulation of material in this area of the bearing housing, which material produces a side wall against the outside, because reference surfaces are preferably provided at the inside of the side walls, which serve as guides for the holding member during assembly and disassembly. In the present case the reference surface can be integral with the material accumulation. Another reference surface of this kind can be provided in the bearing area of the eccentric pin.

In order to positively prevent the "pushbutton function" of the eccentric pin from occurring in the coupling position, it is preferable to provide stops in the bearing housing, which protrude as locking features into the path of the movable parts only in the coupling position. The stops, i.e., in the removal position, are arranged outside of this path.

To ensure satisfactory distribution of the spring functions provided by the resilient tongue, it is preferred to arrange the tongue in the central section of the sheet metal strip so that the spring force is acting equally on the front coupling hook and the rear control arrangement of the holding member so as to develop the mentioned spring functions.

For securing the holding member, it is preferred that the coupling hook contacts the inner surface of the slot wall engaged behind in two points only. This contact can be achieved by simply arranging the edge of the coupling hook to be of curved shape.

Further advantages and measures of the invention will become evident from the claims, the drawings and the following description which explains in detail a preferred embodiment of the present invention.

BRIEF DESCRIPTION OF THE DRAWINGS

A preferred embodiment of the present invention will be described in greater detail with reference to the accompanying drawings, wherein like members bear like reference numerals, and wherein:

FIGS. 1 and 2 are side cross-sectional views and FIGS. 3 and 4 are longitudinal cross-sectional plan views of an area of the framework in accordance with the invention, where the coupling member is shown in two different operating positions, i.e., in a released position ready for coupling in accordance with FIGS. 1 and 3 and in a coupling, clamping position in accordance with FIGS. 2 and 4, with the sections taken along the respective lines I—I, II—II, III—III, and IV—IV;

FIG. 5 is a longitudinal cross-sectional view corresponding to FIG. 3 through the profile bar provided with the coupling member, where the movable components of the coupling member are in an installation position which enables convenient insertion and removal of the coupling member in the profile bar;

FIGS. 6 and 7 are schematic views of the special holding member, FIGS. 8 and 9 are schematic views of the associated bearing housing, and FIGS. 10 and 11 are schematic views of the eccentric pin with the side view of FIG. 10 having a lateral cut-away through which the torsion profile for applying a tool can be seen.

DETAILED DESCRIPTION OF THE PREFERRED EMBODIMENT

Figure 6:
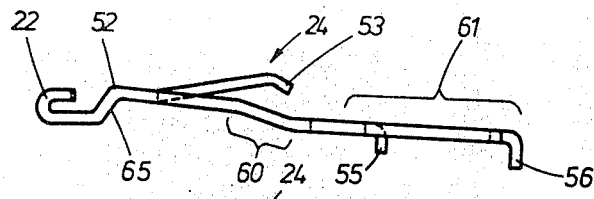
FIGS. 6 to 11 are views, illustrating the three different components of the coupling member according to the present invention, each in a side and plan view, where

For connecting profile bars 10, 11, i.e., an elongated bar having a predetermined exterior contour, coupling members 20 are used which are housed in a hollow space 12 of the hollow section bar 10 from whose face 13 coupling arrangements 21, 22 are projecting. In a coupling situation shown in FIGS. 2 and 4, the coupling arrangements 21, 22 engage undercut longitudinal slots 14 of the profile bar 11. In the illustrated example, the profile bar 11 is a vertical, octagonal column with eight longitudinal slots 14 around its circumference.

The coupling member 20 is a prefabricated assembly consisting of three components, i.e., a bearing housing 23, a sheet metal strip 24 serving as a holding member, and an eccentric pin 25. These components will be described in greater detail below.

The bearing housing 23 is of rectangular shape and has a cross section adapted to match the hollow section or space 12 of the profile bar 10. The bearing housing has the shape of a rectangular tube which, with the exception of the profiles indicated in the following, is open from the front to the rear face, so that the housing 23 actually consists of side walls only. One side wall 26 (located at the front in FIG. 8) is provided at the inner end of bearing housing 23 with a wall cut-out 27 having steps 28 which are chamfered towards the inside and serve as access opening for installing the sheet metal strip 24 equipped with the eccentric pin 25. The wall cut-out 27 blends into a circular bearing area 29 for a correspondingly dimensioned actuating end 30 of the eccentric pin 25.

Figure 8:
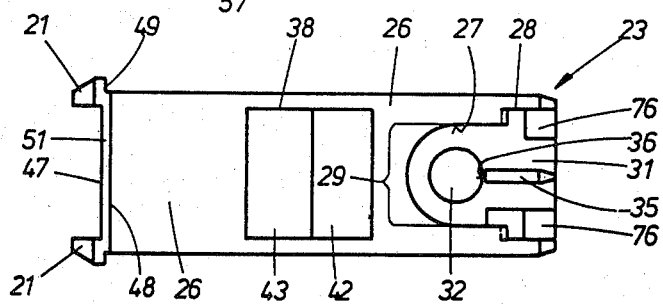
Figure 9:
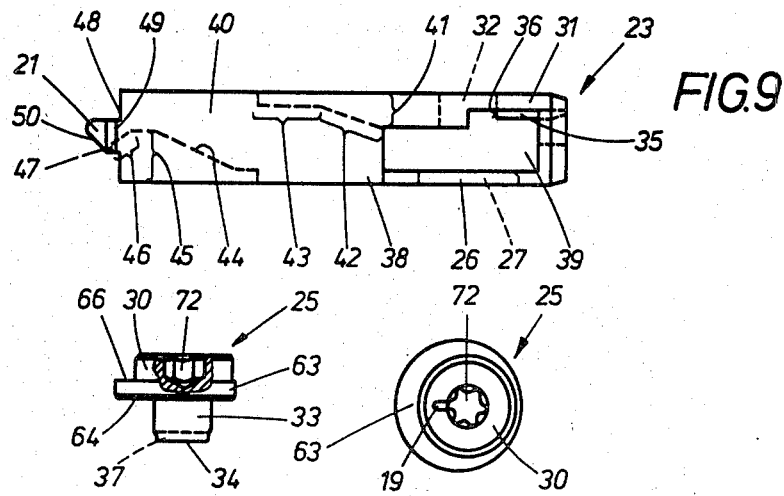
Figure 10:
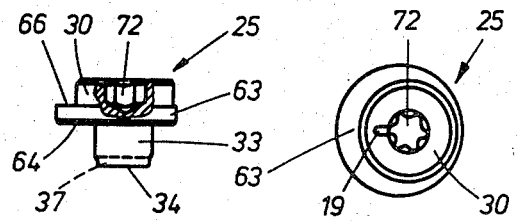
Figure 11:
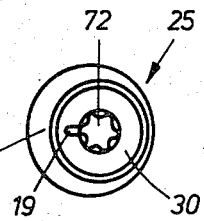

A rear side wall 31 of the housing 23, which is visible through the wall cut-out 27 of FIG. 8, is provided with an opening 32, coaxial with the circular arc of the front bearing area 29, for a journal 33 of the eccentric pin 25 which journal 33, in the installation condition, however, protrudes into only approximately one half of the opening 32 with its face end 34, as is shown in FIGS. 3 and 4. This partial protrusion into the opening 32 (as is evident from the plan view of the bearing housing 23 in FIG. 9) is offset and normally supports the journal 33 only in the left side of the opening 32 shown in FIG. 9. At the opposite side, in front of the opening 32, a pointed strip 35 extending longitudinally is arranged at the rear wall 31. The pointed strip 35 contacts the circumference of the journal 33 with its inner end 36. For insertion, the journal 33 of the eccentric pin 25 mounted on the sheet metal strip 24 is provided with a diagonally extending assembly groove 37 (FIG. 10). The groove 37 defines an aligned rotational position of eccentric pin 25 when the pin 25 is inserted from the side of the mentioned pointed end along the strip 35 into the wall cut-out 27.

The bearing housing 23 is a zinc die-casting and, to provide access to the parts in the casting, has a front window 38 (FIG. 8), an upper window 39 (FIG. 9), and a rear window 40 (FIG. 5). The windows are arranged in various longitudinal sections of bearing housing 23. The windows are, of course, also used to observe the installation procedure and the end position of the sheet metal strip 24 equipped with the eccentric pin 25. The windows enable the special profiles of the two inner surfaces of the front and rear walls 26, 31, which profiles are shown by broken lines in FIG. 9.

The rear side wall 31 is provided in the area of the previously mentioned inner portion of opening 32 with a thicker section 41, in front of which an inclined surface 42 significant for disassembly purposes is arranged. The thicker section 41 eventually blends into a flat inner wall 43. Beyond the front window 38, the opposite inner surface of the front side wall 26 has a rising ramp 44, starting from the window 38 which, in the front area of the bearing housing 23, generates a thicker wall section 45. The wall thickness is initially constant for a short length and eventually declines as a steep wedge surface 46 towards the front of the housing 23. As can be seen from FIGS. 8 and 9, a tip 47 of the wedge surface 46 is slightly protruding beyond the front face end 48 of the bearing housing 23.

Beyond the face end 48, a pair of stationary coupling projections 21 protrude and form one of the above-mentioned coupling arrangements of the coupling member 20. The coupling projections 21 are formed as an extension of the upper and lower side walls of the bearing housing 23. The projections 21 are approximately arrow-shaped and project beyond the upper and lower side wall with a shoulder 49 (FIG. 8) which, (as shown in FIG. 2) in the installation condition, is placed in front of the face 13 in the tube profile of the profile bar 10. Due to this stop effect, the depth of insertion of the coupling member 20 into the hollow space 12 of the profile bar 10 is defined. In the plan view of FIG. 9 the projections 21 have a rising slope 50 to facilitate the insertion of the coupling arrangements into the longitudinal slot 14 of the other profile bar 11. Because the wedge surface 46 extends beyond the housing end 48, the two coupling projections 21 are connected to each other via a continuous wedge-shaped web 51 (FIG. 8).

Figure 7:
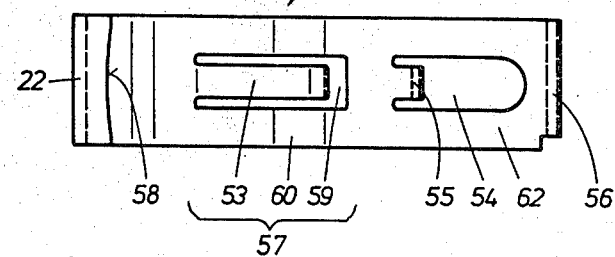

The sheet metal strip 24 has the special shape shown in FIGS. 6 and 7. At its front end, the strip 24 is provided with a rearwardly bent hook 22 with a curved edge 58 so that a movable coupling arrangement is provided in the coupling member 20. From the adjacent center section 57 of the sheet metal strip 24, a resilient tongue 53 is cut out in a U-shaped cut and then bent. Also, in the center section 57, there is a Z-type bend in the sheet metal strip 24. The inner end of the sheet metal strip 24 includes a control section 61 into which a slot 54 is cut, whose edge facing the center is bevelled forming a projecting strip 55 on one surface side 62 of the strip 24. The end of the sheet metal strip 24 is bevelled in the same direction as the strip 55 and forms an end strip 56. The surface side 62 provided with the strips 55, 56 lies opposite the surface side to which the tongue 53 is bent at an angle.

In order to facilitate installation, the eccentric pin 25 with the journal 33 is first inserted into the slot 54 until an eccentric disk 63 of the pin 25 with its inner face 64 (FIG. 10) abuts the previously mentioned surface side 62 of the sheet metal strip 24 like a stop. In this way, diametrically opposed circumferential points of the eccentric disk 63 are placed between the two strips 55, 56. The sheet metal strip 24 with the eccentric pin 25 is introduced through the already mentioned wall cut-out 27 of the bearing housing 23. At this time, the mentioned inclined surfaces and ramps 44 guide the sheet metal strip 24 through the bearing housing 23 along the inner surfaces of the side walls 31, 26.

In the completely installed condition the components of the coupling member 20 are in the positions shown in FIGS. 1 and 3 inside. The coupling hook 22 is then located between the two coupling projections 21 outside of the bearing housing 23. The offset 52 engages in front of the wedge tip 47, whereby the matching inclined surface 65 of the offset (FIG. 6) is placed against the wedge surface 46. The free end of the resilient tongue 53 bears against the mentioned inner wall 43 of the bearing housing 23. The end strip 56 engages behind the eccentric pin 25 at its eccentric disk 63 and thus secures the eccentric pin 25 in the mentioned bearing area 29 of the opening 32. The three components of the coupling member, i.e., the bearing housing 23, the sheet metal strip 24, and the eccentric pin 25 form an assembly without the need for additional securing arrangements. The eccentric disk 63 with its outer face 66 (which can also be seen in FIG. 10) is kept in contact with the inner surface of the front side wall 26 in the bearing housing 23 by the end control section 61 of the sheet metal strip 24. The force of the resilient tongue 57 causes the actuating end 30 of the eccentric pin 25 to protrude laterally beyond the limits of the bearing housing 23.

The assembled coupling member 20 consisting of only three components can be sold as a prefabricated construction unit. The construction unit is inserted into the hollow space 12 of the profile bar 10 through the opening in the face 13. The actuating end 30 of the eccentric pin 25 protruding from the bearing housing can then be pressed like a pushbutton in the direction of arrow 67 shown in FIG. 5. This pressing of the pin 25 causes an elastic deformation of the resilient tongue 53 and the face end 34 of the journal 33 enters the empty space 68 of the opening 32, which can be seen in FIG. 3. This pushing operation in the direction of the arrow 67 moves the entire actuating end 30 below the outer surface of the bearing housing 23. Because the bearing housing is then free from the interfering actuating end 30, the entire coupling member 20 can be pushed into the profile in the direction of arrow 69 until the stop action already mentioned in connection with FIG. 2 between the face 13 and the rear shoulders 49 of the two coupling projections 21 comes into effect.

The eccentric pin 25 will then be in axial alignment with a correspondingly dimensioned cross hole 70 in one side wall of the profile bar 10. Axial pressure along the arrow 67 acting on the eccentric pin 25 is released so that actuating end 30 due to slackening of the elastically deformed resilient tongue 53 is pushed out again and thus enters the cross hole 70. This final condition is shown by the end positions in FIGS. 1 and 3. By engagement of the actuating end 30 in the cross hole 70 of the profile bar 10, the coupling member 20 is secured in the profile bar 10 and cannot fall out again. This is only possible by intentionally exerting pressure in the direction of arrow 67 and simultaneously pulling out the coupling member 20 in the direction of arrow 71 indicated in FIG. 5. The spring force of the resilient tongue 53 is thus also utilized to locate the coupling member 20 in its end position in the profile bar 10.

With reference to FIGS. 1 and 3, the coupling hook 22 in a release position renders the profile bar 10 ready for coupling so that the coupling member 20 can be inserted into a selected longitudinal slot 14 of the column 11. As can best be seen from FIG. 3, the coupling hook 22 is then in alignment with the two coupling projections 21, which alignment is the reason why the coupling arrangements 21, 22 have only a profile width 15 which corresponds to that of one single coupling arrangement. Consequently, the opening width 16 of the longitudinal slot 14 is also of such narrow width so that in a coupling situation the aligned coupling arrangements 21, 22 can be inserted in the other profile bar 11 into the selected slot 14. In the inserted condition the face 13 of profile bar 10 abuts an outer surface 17 of the slot wall. The eccentric pin 25 is in a rotational position (FIG. 1) where the eccentric portion of its eccentric disk 63 faces the coupling projections 21 (FIG. 3). The stationary coupling projections 21 ensure that the profile bar 10, already in the inserted condition, assumes an aligned position relative to the profile column 11.

In order to secure the profile bar 10 in the selected position in the profile column 11, the eccentric pin 25 is rotated by a tool which is introduced into a profiled location 72 in the face of the actuating end 30 which is visible in the cross hole 70 of the profile bar 10. When rotated, the eccentric disk 63 moves the rear strip 56 of the sheet metal strip 24 until the end position shown in FIGS. 2 and 4 is reached. This position is the coupled, clamping position of the coupling member 20. In this clamping position, the eccentric portion of the eccentric pin 25 indicated by a marking 19 has moved in front of the end strip 56, while prior to this, in the release position of FIG. 1, the eccentric portion was situated at the hole end strip 55, i.e., rotated through 180°, as shown in FIG. 3.

As can be seen when comparing FIGS. 1 and 2 the holding member 24 formed by the sheet metal strip has moved inwardly by a distance 73 to the clamping position. The coupling hook 22 has been pushed inwards correspondingly. However, because the mentioned matching inclined surface 65 of the offset 52 of the holding member 24 is in contact with the wedge surface 46 of the bearing housing 23 due to the pressure of the resilient tongue 53, the matching inclined surface 65 is simultaneously displaced laterally by the wedge surface 46 during the inward motion of the holding member 24 so that the coupling hook 22 performs the swivel motion indicated by arrow 74 in FIG. 4. This swivel motion moves the edge 58 beyond the slot opening 16 and in front of the slot inner wall 18 against which the hook 22 is firmly pressed during the last phase of the clamping motion of the eccentric 63. Due to the curved design of the edge 58 of the hook 22, a two-point contact is obtained in accordance with FIG. 7. In the clamping position, the stationary coupling projections 21 are firmly pressed against an inner surface 75 of the slot opening opposite the hook edge 58 (FIG. 4). The two profile bars 10, 11 are now securely coupled to each other. The stationary coupling projections 21 do not allow any torsional motion of the profile bar 10.

In the clamping position in accordance with FIGS. 2 and 4, the actuating end 30 cannot be pressed in axially against the resilient tongue 53 for the purpose of initiating the above described removal of the coupling member 20 from the inside of profile bar 10. In this way, disengagement of the coupled profile bars 10, 11 cannot be accomplished by an erroneous axial pressure acting on the eccentric pin actuating end 30 for removal of the coupling member 20. As can best be seen from FIG. 8, the rear side wall 31 of the bearing housing 23 carries stops 76 on its inside formed by integral blocks which, in the clamping position, move under the rear end of the control arrangement or section 61 of the holding member 24. The holding member 24 is then locked and cannot be pressed axially inward against the force of the resilient tongue 53, as can be seen in FIG. 4. If, however, the release position shown in FIGS. 3 and 5 is present, the holding member 24 has moved axially outwards until its rear end is situated beyond the stops 76 so that an axial pressure along the arrow 67 can be applied in accordance with FIG. 5.

The eccentric pin 25 is made from case-hardened steel. When rotating the eccentric pin 25 to the clamping position of FIGS. 2 and 4, the bend 60 (explained in connection with FIG. 6) is permitted to induce a longitudinally acting resilience in the holding member 24. When the eccentric is rotated, the bend 60 can extend. In this way, the edge 58 of the coupling hook 22 remains pressed firmly against the slot inner wall 18 with a defined holding force.

In order to separate the two profile bars 10, 11, the eccentric pin 25 is rotated again to the release positon of FIGS. 1 and 3. The eccentric disk 63 then presses against the front strip 55, and the holding member 24 is pushed outwardly by the already mentioned distance 73. The matching inclined surface 65 slides downwards along the wedge surface 46 under the force of the resilient tongue 53, and the coupling hook 22 is swivelled back in the direction opposite the arrow 74 of FIG. 4 so that the coupling hook 22 reaches alignment again with the two coupling projections 21. The edge 58 of the coupling hook 22 has again cleared the slot inner wall 18. The coupling arrangements 21, 22 can then be pulled out of the longitudinal slot 14 so that the profile bars 10, 11 are separated.

The principles, preferred embodiment and mode of operation of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit of the present invention. Accordingly, it is expressly intended that all such variations and changes which fall within the spirit and scope of the present invention as defined in claims be embraced thereby.

What is claimed is:

1. A framework of separably connected profile bars comprising:
    at least one profile bar having several undercut longitudinal slots and another profile bar having a hollow section for face end acceptance of a coupling member;
    the coupling member comprising two different kinds of coupling means for engaging the at least one profile bar and protruding from the face end of the other profile bar, which, in a coupling situation, can be inserted into a longitudinal slot and clamped therein, the coupling means includes
    one pair of stationary coupling projections at an end of a bearing housing fitted in the hollow section, and
    a movable coupling hook arranged between said two projections at the end of a holding member, said holding member being longitudinally movable in the bearing housing;
    the bearing housing being provided with a wedge surface oriented inwardly and transversely of the housing spring means for pressing a matching inclined surface of the holding member against said wedge surface;
    an eccentric pin passing through the holding member and being rotatably supported in the bearing housing, said pin extending transversely relative to the profile bar and having an actuating end adapted to engage a cross hole of the profile bar receiving the coupling member;
    said eccentric pin upon rotational movement moving said holding member in a longitudinal direction of the profile bar and thereby displacing the coupling hook at the end of the holding member transversely relative to the longitudinal direction by the cooperation of the matching inclined surface along the wedge surface in bearing housing against the spring means;
    the holding member being a sheet metal strip provided with the spring means defined by a resilient tongue cut out of the sheet metal strip and bent, a free end of the tongue bearing against an inner wall of bearing housing;
    the holding member being guided in a longitudinal direction and the tongue generating a spring force between the matching inclined surface of the holding member and the wedge surface of the bearing housing;
    the wedge surface extending between the two coupling projections of the bearing housing and being engaged by an offset of the sheet metal strip defining the matching inclined surface of the holding member, said offset locating the eccentric pin in a rear wall cut-out of the bearing housing, said cut-out serving as an access opening; and
    the resilient tongue acting through a control section of the holding member for forcing the eccentric pin out of the bearing housing and maintaining the actuating end of the pin resiliently engaged in a cross hole of the profile bar such that, upon installion of the bearing housing, the eccentric pin in bearing areas in the bearing housing is pressed in axially against the force of the resillient tongue until the actuating end extends out of the cross hole of the profile bar.

2. The framework in accordance with claim 1, wherein:
    the holding member includes a slot extending in the direction of longitudinal movement for facilitating insertion of a journal of the eccentric pin, said holding member being provided on either end of the slot with transverse strips on a surface side of the sheet metal strip which side faces away from the resilient tongue;
    the eccentric pin includes an eccentric disk arranged adjacent to the holding member, the disk bearing against a side wall of the bearing housing with its outer face acting as a stop; and
    the eccentric disk being diametrically surrounded by the two strips, one of said strips acting to effect the inward thrust and the other of said strip acting to effect the outward thrust of the holding member.

3. The framework in accordance with claim 1, wherein the two strips are defined by bent sheet metal edges of the sheet metal strip, one of the strips forming a strip at the end of the slot and the other forming a strip at the end of sheet metal strip.

4. The framework in accordance with claim 1 or 2, wherein the bearing housing is provided with inclined surfaces on an inside of side walls for facilitating insertion or removal of the holding member.

5. The framework in accordance with claim 1, wherein the bearing housing is provided with stops which, in a clamping position of the holding member protrude as locking elements into the path of portions of the holding member but which, in the coupling positon, are arranged outside of said path.

6. The framework in accordance with claim 1, wherein the sheet metal strip of the holding member is provided with a Z-type bend which, upon clamping of the holding member extends to establish a longitudinal resilience in the holding member.

7. The framework in accordance with claim 1, wherein the resilient tongue is arranged in a center section of the sheet metal strip between the front coupling hook and the rear control section.

8. The framework in accordance with claim 1, wherein the coupling hook has a curved edge for a two-point contact at an inner wall of the longitudinal slot in the at least one first bar behind which the hook engages.

9. A framework of separably connected bars comprising:
- at least one first bar having several undercut longitudinal slots and a second bar having a hollow section for face end acceptance of a coupling member;
- the coupling member comprising two different kinds of coupling means for engaging the at least one first bar and protruding from the face end of the second bar, the coupling means being inserted into one longitudinal slot and clamped therein to couple the first and second bars to one another, the coupling means including
    - one pair of stationary coupling projections at an end of a bearing housing adapted to fit in the hollow section, and
    - a movable coupling hook arranged between said two projections at the end of a holding member, said holding member being movable in a longitudinal direction of the bearing housing;
- the bearing housing being provided with a wedge surface oriented inwardly and transversely of the housing, spring means for pressing a matching inclined surface of the holding member against said wedge surface;
- an eccentric pin passing through the holding member and being rotatably supported in the bearing housing, said pin extending transversely relative to the second bar and having an actuating end adapted to engage a cross hole of the second bar receiving the coupling member;
- said eccentric pin upon rotational movement moving said holding member in the longitudinal direction of the second bar and thereby displacing the coupling hook at the end of the holding member transversely relative to the longitudinal direction by the cooperation of the matching inclined surface along the wedge surface of the holding member in the bearing housing against the force of the spring means;
- the holding member being a sheet metal strip provided with the spring means defined by a resilient tongue cut out of the sheet metal strip and bent, a free end of the tongue bearing against an inner wall of the bearing housing;
- the holding member being guided in the longitudinal direction and the tongue generating the spring force between the matching inclined surface of the holding member and the wedge surface of the bearing housing;
- the wedge surface extending between the two coupling projections of the bearing housing and being engaged by an offset of the sheet metal strip defining the matching inclined surface of the holding member, said offset locating the eccentric pin in a side wall cut-out of the bearing housing, said cut-out serving as an access opening; and
- the resilient tongue acting through a control section of the holding member for forcing the eccentric pin out of the bearing housing and maintaining the actuating end of the pin resiliently engaged in the cross hole of the second bar such that, upon installation of the bearing housing, the eccentric pin in bearing areas in the bearing housing is pressed in axially against the force of the resilient tongue until the actuating end extends out of the cross hole of the second bar.

* * * * *